Jan. 29, 1952 R. C. ZEIDLER 2,583,621
CLUTCH LEVER ASSEMBLY
Filed Aug. 28, 1948 2 SHEETS—SHEET 1
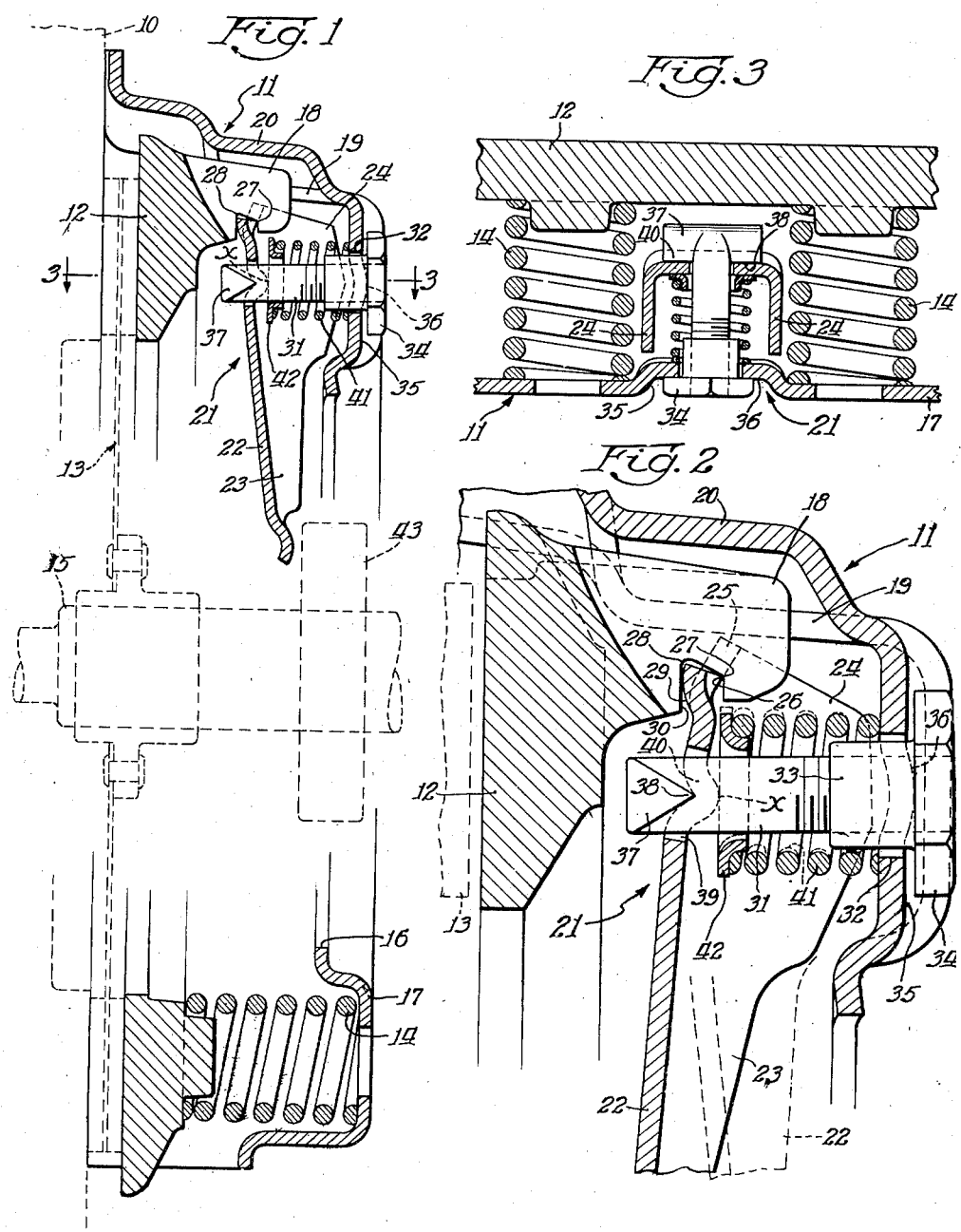
Inventor:
Reinhold C. Zeidler Jan. 29, 1952
R. C. ZEIDLER
2,583,621
CLUTCH LEVER ASSEMBLY
Filed Aug. 28, 1948
2 SHEETS—SHEET 2
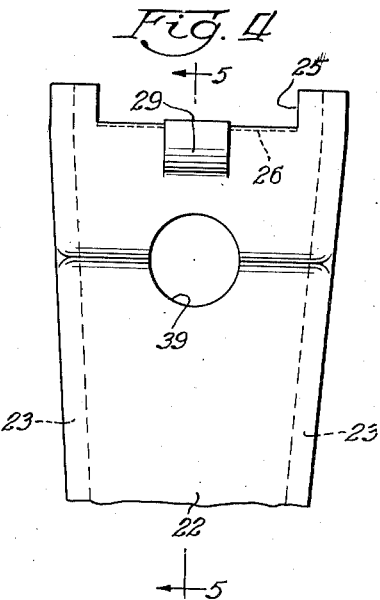
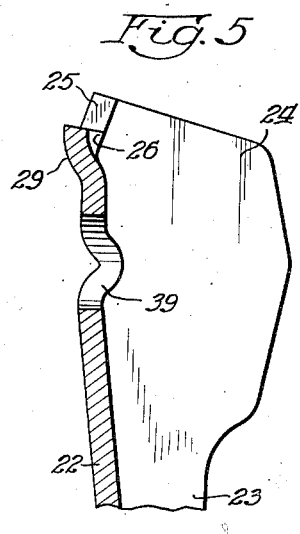
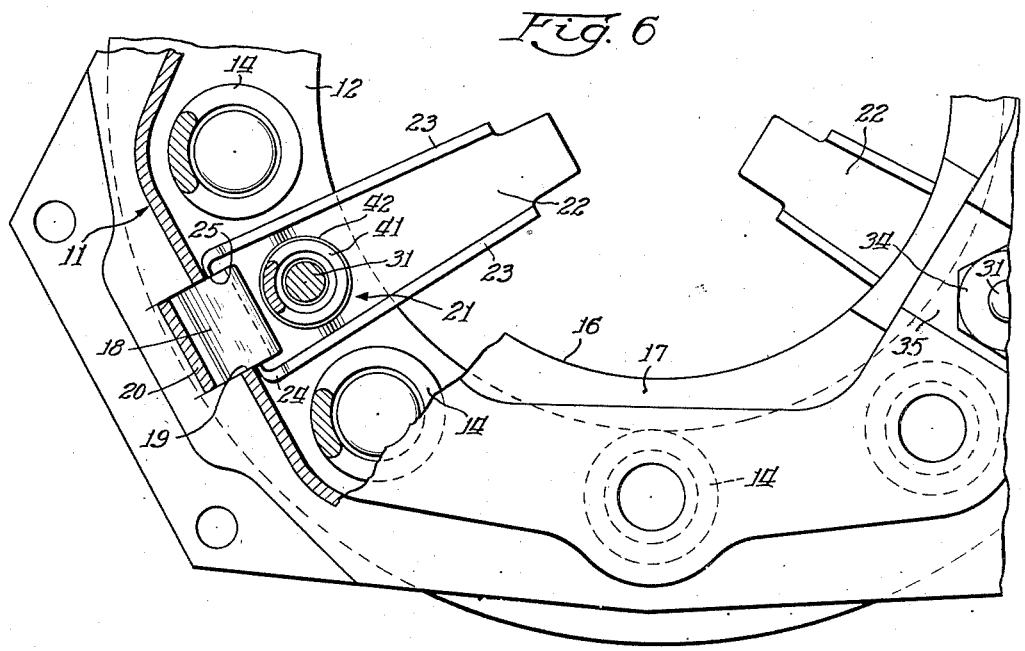
Inventor
Reinhold C. Zeidler Patented Jan. 29, 1952

2,583,621

UNITED STATES PATENT OFFICE 2,583,621

CLUTCH LEVER ASSEMBLY

Reinhold C. Zeidler, Detroit, Mich., assignor to Borg-Warner Corporation, Chicago, Ill., a corporation of Illinois Application August 28, 1948, Serial No. 46,660

6 Claims. (Cl. 192—99)

The present invention relates generally to friction clutch assemblies such as are usually installed in motor vehicles, and the improvements have particular relation to a novel arrangement for axially shifting the pressure plate of such clutch assembly.

It is one of the principal objects of this invention to simplify the construction of a clutch assembly such as contemplated herein, and also to improve the efficiency and operation of such assembly.

Primarily, an object hereof resides in the provision of a clutch assembly wherein low operating pressures are effected by eliminating the major portion of the friction between the parts of the clutch releasing mechanism, so that less power is required to disengage the frictionally engaged members of the assembly. The present arrangement also reduces the production cost of the clutch.

Another object is to utilize the special formation of the release lever for creating centrifugal force to assist in effecting the engaging packing pressure in a friction clutch assembly.

A further object of this invention is to provide frictionless mounting means for the levers which operate the pressure plate, such mounting means having incorporated therein a plurality of blade-like fulcrums interposed between the levers and the clutch cover or back plate on which the levers are supported.

An additional object is the provision of a blade-like pivotal engagement between the operating levers and the pressure plate.

It is a further object hereof to provide novel lever mounting means comprising a headed oscillatory bolt which supports the release lever and has anti-frictional contact with an adjacent portion of the rear outer surface of the cover or back plate. In this connection, coiled spring retainer means are provided for the bolt and lever, such means including a spring-seating washer which has an antifrictional rocking movement on a specially formed portion of the lever adjacent the bolt.

Additional objects, aims, and advantages of the invention contemplated herein will be apparent to persons skilled in the art after the construction and operation of the clutch assembly is understood from the within description. It is preferred to accomplish the numerous objects of this invention, and to practice the same, in substantially the manner hereinafter fully described and as more particularly pointed out in the appended claims. Reference is now made to the accompanying drawings that form a part of this specification.

In the drawings:

Fig. 1 is a central axial section of a clutch assembly made in accordance with the present invention, the view showing the relative positions of the clutch parts when in an engaged position;

Fig. 2 is a fragmentary sectional view similar to Fig. 1 and showing the relationship of the clutch parts when disengaged;

Fig. 3 is a section taken along the plane of line 3—3 on Fig. 1;

Fig. 4 is a plan of the radial outer region of an operating or release lever such as contemplated herein;

Fig. 5 is a longitudinal section of such lever, taken along the plane of line 5—5 on Fig. 4; and Fig. 6 is a fragmentary plan, partially broken away, looking at the assembly from the rear.

The drawings are to be understood as being more or less of a diagrammatic character for the purpose of disclosing a typical or preferred form of the invention contemplated herein, and in these drawings like reference characters identify the same parts in the different views.

Referring more particularly to Figs. 1 and 2, the clutch assembly comprises a flywheel 10 having a dished cover 11 secured thereto, which cover envelops or houses the pressure plate 12 and the driven clutch plate 13 that is adapted to be frictionally packed between the opposing faces of the flywheel and pressure plate by a plurality of coiled springs 14 arranged in annular array between the cover and the pressure plate. The flywheel 10 is carried upon and rotated by an engine crankshaft (not shown) and the clutch driven plate 13 is mounted for sliding movement on the driven shaft 15 which projects into a cover through a large opening 16 in the back plate 17 of the cover 11. The pressure plate 12 has a driving connection with the cover 11 to permit it to rotate with the flywheel. This driving connection is effected by means of lugs 18 which project rearwardly and axially from the body of the pressure plate and are received in openings 19 that are formed by slitting the normal side wall of the cover and outwardly displacing the metal between the slits as shown at 20. The side edges of the slits defining each opening 19 are smooth so that the side faces of the lugs 18 may closely engage such smooth edges with but a minimum of clearance between these parts.

The means for releasing the pressure plate 12 from its engaged position in the present assembly preferably comprises the lever and lever mounting assembly identified generally as 21. There may be three or more of such assemblies, and for the purpose of clearness, a single assembly will be described in detail. The lever 22 comprises a sheet metal stamping of U-shape cross-section, the side flanges 23 of which are parallel and are gradually increased in height in a radially outwardly direction so that the width of these flanges at their outer regions 24 are effective to create a centrifugally unbalancing of the lever when the clutch assembly is being rotated by the flywheel 10.

As seen in Figs. 4 and 5, the radially outer end portion of the lever is preferably recessed as at 25 and the inner edge of this recess is upset to provide a sharp knife-edge 26 for engagement in an angular corner 27 in a notch 28 formed in the radially inward edge of the pressure plate lug 18 as clearly shown in Figs. 1 and 2, where it will seem this notch is open in a radial inward direction. The portion of the lever recess which is opposite the knife-edge 26 is upset and pressed away from said knife edge thereby to provide a segmental bearing surface 29 which is defined by an arc of a circle having its radius at the apex of the knife edge 26. The bearing surface 29 above mentioned is adapted to contact and sweep the surface of the wall 30 of the notch 28 which is opposite the angular corner 27 whenever said lever is swung forwardly or rearwardly to shift the pressure plate 12 in an axial direction.

The means for supporting the lever 22 preferably comprises a mounting bolt 31, the shank of which is threaded part way its length and extends through an opening 32 in the back plate 17 of the cover. This bolt 31 preferably has a slight oscillatory movement with respect to the cover back plate, and since it comprises a member of the operating linkage between the cover and pressure plate, it accommodates the lever to the compound movements of said linkage without friction. A flanged sleeve or collar 33 is threaded on the bolt shank and is so arranged that its flange or headed portion 34 is outside the cover where it is seated in a shallow depression 35 stamped inwardly in the cover back plate 17. A crown 36 extends on opposite sides of the bolt opening 32 and the flange 34 of the collar is engaged with and is adapted to rock on this crown during swinging movement of the lever. It will be apparent that this rocking arrangement between the bolt head or flange and the contiguous portion of the cover back plate is of an antifrictional character.

The bolt 31 is of a generally T-shape and the cross member 37 thereof has a knife edge 38 which points rearwardly towards the headed or flanged end of the bolt. As seen in Figs. 1 and 2, the shank of the bolt passes through an opening 39 in the lever and there is a concavo-convex embossment 40 on the lever which extends on opposite sides of such opening. The knife edge 38 of the bolt arm is seated in the deepest portion of the concave surface so that there is a minimum of contact between the bolt arm and the lever, thus materially reducing friction during operation of the lever. The lever is urged towards and it is maintained in contact with the knife edge 38 by means of a reaction spring 41 surrounding the bolt, one end of said spring being engaged with the cover back plate and the other end of said spring being seated on a flanged washer 42 encircling the shank of the bolt slightly rearwardly of the knife edge. The reaction spring 41 is made of a heavy gauge wire with its ends trued to right angles to its axis, and it is capable of taking loads and reactions in both directions. The washer 42 contacts the convex surface of embossment 40 on which it is adapted to rock or roll, thereby providing a frictionless engagement between these parts. The reaction spring 41 on the T-bolt performs dual functions, that of keeping the lever engaged with the bolt knife edge 38 even at high rotational speed of the clutch, and it causes a radial outward thrust of the lever to maintain the outer fulcrum edge 26 in the corner 27 of the recess 28 on pressure plate lug 18. As seen in dotted lines on Fig. 2, the latter function causes a canting or cocking of the spring due to the fact that bolt hole 32 in the cover plate is larger than bolt hole 29 in the lever. Thus the bolt and reaction spring will set at a slight angle to the axes of the holes.

It will be understood that the levers 22 are operated to release the clutch by means of the usual thrust collar 43 which slides on the driven shaft 15 and is moved by means of a suitable yoke or fork, manually operated by a foot pedal, in the usual manner. When the clutch assembly is rotating, the speed-responsive portions 24 of the lever flanges will tend to swing the outer ends of the levers in a forward direction on the knife edge mounting so that the arcuate lever surface 29 presses against the notch wall surface 30. The centrifugal force is taken between the lever 22 and the washer 42 at $x$ (Figs. 1 and 2) and is resisted by the reaction spring 41. When centrifugal forces have been built up sufficiently for clutch engagement, such forces will then overcome the tension of the reaction springs 41 and the levers will assist the packing springs 14 to move the pressure plate 12 against the friction disc 13 and urge the latter into firm engagement with the adjacent flywheel surface. In clutch engaged position (Fig. 1) the washer 42 is effective to maintain the lever engaged against the T-bolt, thus exerting a thrust on the bolt in a radially outward direction to keep the lever end 26 in the bottom of the pressure plate recess 28. Any movement of the clutch levers, either centrifugally or when moved by the thrust collar 43, is readily effected with low operating pressure due to the frictionless engagement between the parts of the pressure plate operating assemblies. The mounting bolts 31 react in an oscillatory manner to the movements of the release levers and assume the relative positions shown in Figs. 1 and 2.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. A clutch assembly comprising a dished cover secured to a driving member and having a radially inward extending flange, said flange having an aperture therein; a pressure plate housed within said cover and having driving connection therewith; a lever within said cover for axially shifting said pressure plate; a T-shape bolt received in said cover aperture; a knife-edge on the cross-member of bolt; an embossed crown on said lever, said knife-edge being seated in the concave portion of said crown to fulcrum said lever; a washer encircling said bolt and having rocking movement on said lever crown; and a coiled spring surrounding the shank of said bolt between said cover flange and said washer for maintaining said lever engaged with said knife edge and to accommodate rocking movement of said washer.

2. A clutch assembly comprising a dished cover secured to a driving member and having a radially inward extending flange, said flange having an aperture therein; an elongate arched crown on said flange extending on opposite sides of said aperture; a pressure plate housed within said cover and having driving connection therewith; a lever within said cover for axially shifting said pressure plate; an oscillatable T-shape bolt received in said cover aperture and having a threaded outer portion; an adjusting sleeve threaded on said outer portion of said bolt; a radial flange on said sleeve engaged with said crown and being adapted to rock theron for effecting oscillation of said bolt during the movement of said lever which shifts said pressure plate; a knife-edge on the cross-member of said bolt; an embossment on said lever, said knife-edge being seated in the concave portion of said embossment to fulcrum said lever; a washer encircling said bolt and having rocking movement on the convex portion of said embossment; and a coiled spring surrounding the shank of said bolt between said cover flange and said washer for maintaining said lever engaged with said knife edge and to accommodate the aforesaid movements of said bolt and said washer.

3. A clutch assembly including a cover anchored to a driving member and having a radial flange defining a back plate which is spaced axially from said driving member; a crown on said back plate, and an aperture extending through said crown; a pressure plate within said cover and having driving connection therewith; spring means urging said pressure plate in a direction toward the driving member; a radially extending release lever within said cover adapted to move said pressure plate toward said back plate in opposition to said spring means; a concavo-convex embossment on said lever projecting rearward toward said back plate and having an aperture of smaller dimensions than said back plate aperture and axially alined therewith; an oscillatable fulcrum post passed through said alined apertures, said post having flange means on its rear end outside said back plate and engaged with said crown to rock thereon; a cross-member on the opposite end of said post forward of said lever, said cross-member having a tapered cross-section with the apex thereof seated in the concave portion of said lever embossment; a washer surrounding said post between said back plate and said lever and being rockably engaged with the convex portion of said lever embossment; and a coiled spring surrounding said post and engaged at one end with said back plate and seated at its other end on said washer, thereby maintaining said lever against dislodgement, and accommodating movements of said post and said washer.

4. A clutch assembly comprising an axially shiftable pressure plate having an angular recess therein; a cover drivingly connected to said pressure plate; a radially extending release lever having a pivotal knife edge engagement in the angular recess of said pressure plate; a T-shape fulcrum bolt extending through said cover and said lever, said bolt having a head rockably engaged with the outer surface of said cover; a rearwardly facing knife edge on the cross-member of said bolt having fulcrum contact with the forward surface of said lever; a washer member surrounding said bolt and having rockable engagement with the surface of said lever opposite said knife edge; and a coiled spring surrounding said bolt, said spring having one end engaged with said cover and its other end seated on said washer, said spring arrangement being effective to maintain said lever in assembly with said pressure plate and said bolt, and also to accommodate movements of said bolt and said washer.

5. A clutch assembly as defined in claim 4 wherein the lever has a U-shape cross-section, and the bolt, spring, and washer are positioned between the side flanges of said U-shape.

6. A clutch assembly as defined in claim 4 and including, yieldable means urging the pressure plate in a direction away from the cover; the lever having a U-shape cross-section and the side flanges thereof are materially increased in height at approximately the location of the bolt to define speed-responsive weight means for supplementing the pressure of the yieldable means upon the pressure plate; and the bolt, spring, and washer being positioned between said lever flanges at approximately the increased height of said flanges.

REINHOLD C. ZEIDLER.

REFERENCES CITED

The following references are of record in the file of this patent:

UNITED STATES PATENTS

| Number | Name | Date |
|---|---|---|
| 1,513,203 | Wemp | Oct. 28, 1924 |
| 1,756,428 | Jones | Apr. 29, 1930 |
| 1,768,346 | Thompson | June 24, 1930 |
| 1,855,643 | Matthews | Apr. 26, 1932 |
| 1,875,696 | Beringer | Sept. 6, 1932 |
| 1,959,036 | Nutt | May 15, 1934 |
| 2,060,773 | Pearmain | Nov. 10, 1936 |
| 2,062,102 | Nutt et al. | Nov. 24, 1936 |
| 2,406,244 | Nutt | Aug. 20, 1946 |